INVENTORS
T. C. Nuttall
G. H. Askew
BY

ATTORNEYS

United States Patent Office 3,379,944
Patented Apr. 23, 1968

3,379,944
MOVEMENT CONTROL SERVOMECHANISM
Thomas Cayton Nuttall, Croydon, and Gerald Hamilton Askew, London, England, assignors to Rank-Bush Murphy Limited
Filed Apr. 26, 1965, Ser. No. 450,700
Claims priority, application Great Britain, Apr. 29, 1964, 17,691/64
10 Claims. (Cl. 318—18)

This invention relates to a movement control servomechanism, and relates in particular to apparatus for controlling with reference to a train of periodically recurrent reference impulses the movement of a member driven by means capable of producing accelerations of said member only within predetermined limits of magnitude. In practice the moving member will most frequently be a rotating shaft, though in some applications it may be desired to control the movement of a member moving rectilinearly, or in some other manner. The modifications of apparatus according to the invention which will be necessary to adapt it for such non-rotary movement are obvious to those skilled in the art and will not be further considered here.

In particular, though in no way limited to this specific application, the invention may very advantageously be made use of to control an electric motor driving a continuous-motion television film scanner, that is to say, a film scanner in which the film passes at a constant speed through a scanning position, the film motion itself providing part of the vertical component of the scanning action. The invention will therefore be dicussed chiefly in regard to its application to this particular purpose.

It is found in practice that in film scanners of this kind the error in synchronisation from field to field should be kept below 20 $\mu$s. if inadmissible less in definition due to misregistration of consecutive scanning fields is to be avoided. Since a gradual drift in picture position will be imperceptible if it takes place sufficiently slowly, the error may be allowed to increase very slowly but, even over very long periods, should be kept within 100 $\mu$s. to maintain reasonable consistency in picture framing at the receiver.

The influences tending to produce errors in synchronisation are mainly those internal to the machine, such as varying friction in the bearings, but the master scanning frequency of the television system with which the scanner is associated is also subject to variations, occasionally abrupt, which must be accurately followed by the scanner mechanism. It will be obvious that variations in speed due to causes within the machine may be reduced by the use of a flywheel, and that the greater the inertia of this flywheel the less would be the effect of cyclic variations in machine friction. A large flywheel, however, will increase the difficulty of following variations in the scanning frequency. Too large a flywheel would also require an excessively large power to bring it up to speed from standstill within a reasonably short period of time, say some 2 to 3 seconds. The size of flywheel chosen will thus be a compromise.

Most of the possible errors are of a type which will increase rapidly with time if corrective action is not applied promptly. It is therefore necessary for the driving means to respond rapidly to a change in control potential. It is often advantageous to employ a direct-current commutator motor operating with constant field excitation, the armature current being changed to vary the torque. Armature reaction compensating windings may be provided on such a motor so as largely to neutralise the armature inductance, leaving the residual inductance sufficiently low that it does not seriously delay the production of a desired change in armature current. In the following discussion of the reasoning underlying the invention it will be assumed that the armature current, and hence the motor torque, can be change instantaneously. In practice, any departure from this ideal condition may be allowed for in the appropriate part of the control system.

If the torque applied at any time differs from that required to keep the controlled member in movement at a constant velocity, then an acceleration or deceleration of the member must result. The available torque, and hence the acceleration which can be produced, has finite limits. Let is be assumed that the normally small disturbances occurring within the system can be corrected without requiring the use of the maximum acceleration available, but that limited acceleration will inevitably restrict the speed of recovery of the system after a sufficiently violent disturbance. The maximum available acceleration will, of course, be used in the normal course of bringing the machine to the desired speed from a stationary condition.

The continual small changes in acceleration required to hold the member in synchronism with the reference impulses must be determined by a process of computation for which the input data is the observed error. The source of reference pulses may, in the case of a television film scanner, conveniently be the field synchronising impulses which, in the case of the existing British 405-line system, are repetitive with a nominal periodicity of 20 milliseconds. In order to facilitate comparison of the movement of the member with the reference impulses it will usually be convenient to provide the member with a simple generator arranged to produce pulses which, when the member is moving in a desired manner, are of the same periodicity and phase as the reference impulses. In the case of a television film scanner it will generally be most convenient for such a generator to be so phased mechanically that the pulses it generates are in coincidence with the television field synchronising impulses when the machine is operating in the desired state of synchronisation. A measurement of the time interval between the pulses (with the appropriate signal) is then a measure of the error of the system.

This measurement can be effected with considerable accuracy, but each measurement applies only to a particular instant of time and after each measurement there is a waiting period (of about 20 milliseconds in the case of the television scanner discussed) before a new measurement can be made. The collection of information concerning the state of the system is thus a discontinuous process.

The quantity thus directly observed in a phase or positional error. The velocity or frequency error can be derived only by comparing two consecutive positional or phase errors and making allowance for any acceleration being produced during the interval. It will therefore be necessary to store a number of items of information relating to past errors and to past connections and to bring this stored information up to date each time that a new measurement is made.

Since the effects of changes in friction have to be neutralised and since these effects are indistinguishable from changes in acceleration, the assessment of which requires a comparison of three positional measurements, exact correction requires that the time necessary for these three measurements shall elapse before correction is fully completed. Since the third measurement is necessary only to determine what permanent change in acceleration is necessary in order to overcome a detected change in friction, it is possible in applications where a small positional drift with respect to the theoretical position is allowable, to arrange that correction is based upon the results of two measurements only.

The necessary correcting action can be initiated only when an error has been detected, so that any change in conditions must give rise to some error. In apparatus according to the invention it is arranged that for small deviations, when the system is operating under linear conditions, the velocity error and the positional error are simultaneously reduced to zero when the corrections resulting from two consecutive measurements have been applied, that is, at the end of two pulse intervals.

The present invention provides means for controlling the movement of a member driven by drive means capable of producing acceleration of said member only within predetermined limits, with reference to a train of periodically recurrent reference impulses, comprising means for deriving a further train of impulses which when said member is moving in a desired manner are synchronous with said reference impulses, means for deriving a phase error signal representing the difference in timing between impulses in said impulse trains, means for deriving an error difference signal representing the difference between successive values of said phase error signal, means for deriving a velocity error signal proportional to said error difference signal added to one-half a delayed feedback signal, means for deriving a first control potential proportional to one-half said velocity error signal added to said phase error signal, non-linear circuit means fed with said first control potential and yielding a second control potential, the transfer characteristic of said circuit means being such that its response to signals of either polarity within a predetermined range is linear while for signals exceeding said range it has an incremental gain which continuously diminishes as the signal magnitude increases, means for deriving a final control potential proportional to the sum of said second control potential and said velocity error signal, means for applying said final control potential to control said drive means so as to produce an acceleration of said member which within said predetermined limits is proportional in amount and sense to the magnitude and polarity of said final control potential, means for developing a feedback signal proportional to the force applied to said member by said drive means, and means for delaying said feedback signal by one pulse period to produce said delayed feedback signal.

Preferably the factors of proportionality used in apparatus according to the invention are such that the controlled member is made least responsive to small disturbances. This condition is obtained if the body is subjected to a force A of which the value is defined by the equation:

$$A = -\tfrac{3}{2}V - E$$

where A is the force applied to the controlled member during a period between successive measurements, V is the value of the velocity error measured at the commencement of this period and E is the value of the phase error measured at the same time.

The equation given above gives the desired conditions of operation for small disturbances. When larger disturbances are to be removed, it is found advantageous to limit the excursion of the controlling signals by the use of the non-linear circuit.

It is advantageous in some more exacting application of the invention to add to the devices already recited means for performing the operation of summing the errors and for adding a correction proportional to this sum. When this is done full correction will be effected in three periods.

Features and advantages of the invention will be appreciated from the following description taken in conjunction with the accompanying drawings in which like elements appearing in several figures carry like reference characters and in which.

Figure 2A:
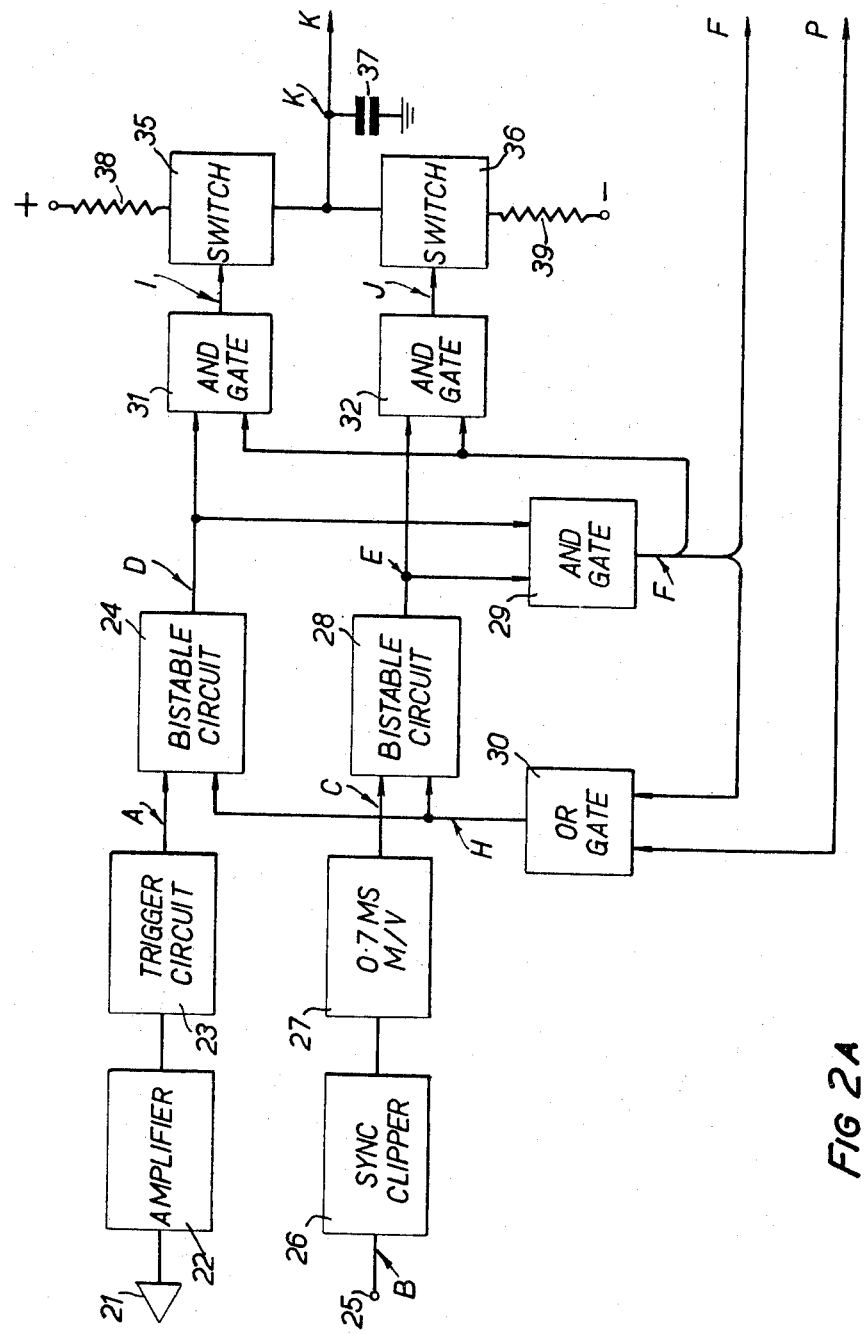
FIGURE 2 is a block schematic diagram of part of the circuitry of one embodiment of apparatus according to the invention for use in controlling the operation of a television film scanner.
Figure 2B:
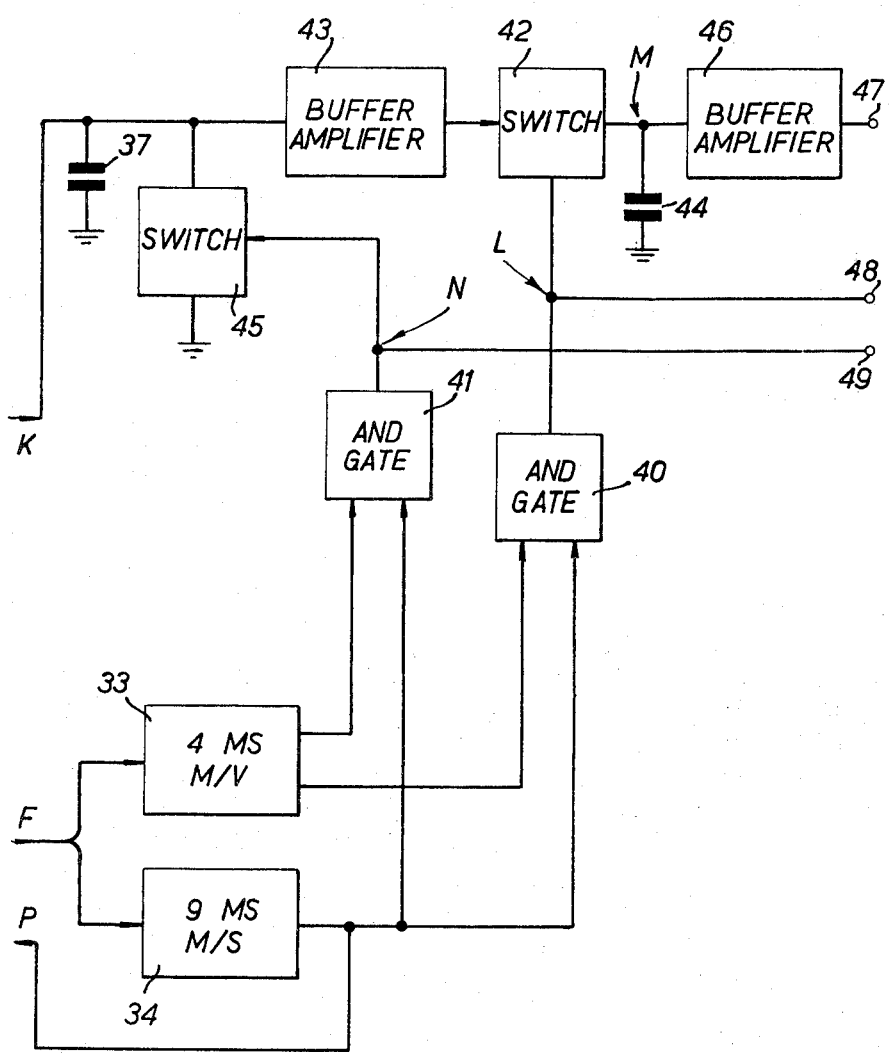
Figure 3:
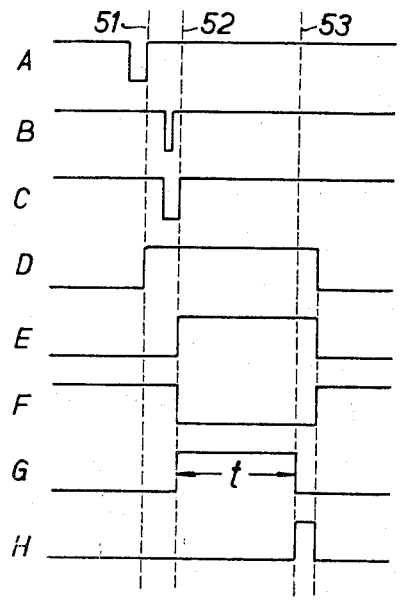
Figure 3:
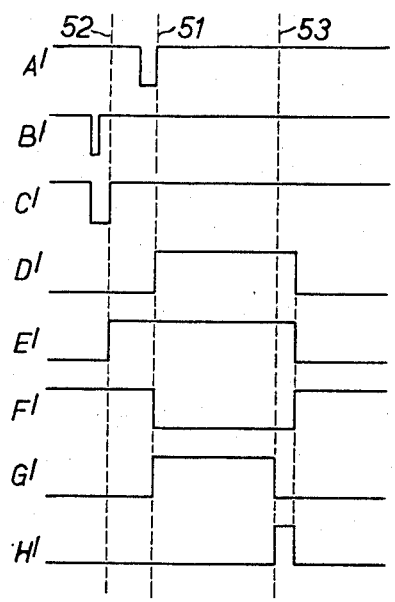
Figure 3:
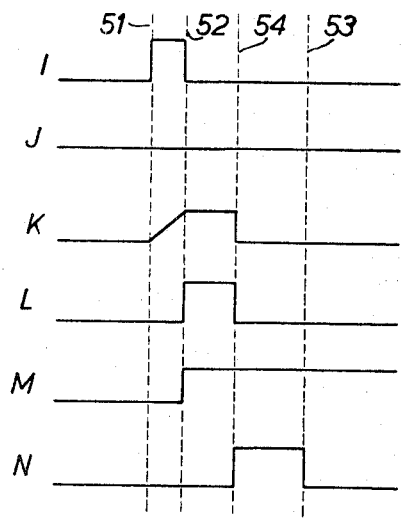
Figure 3:
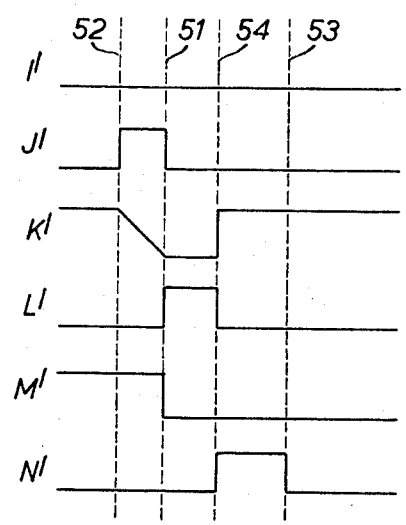
Figure 4:
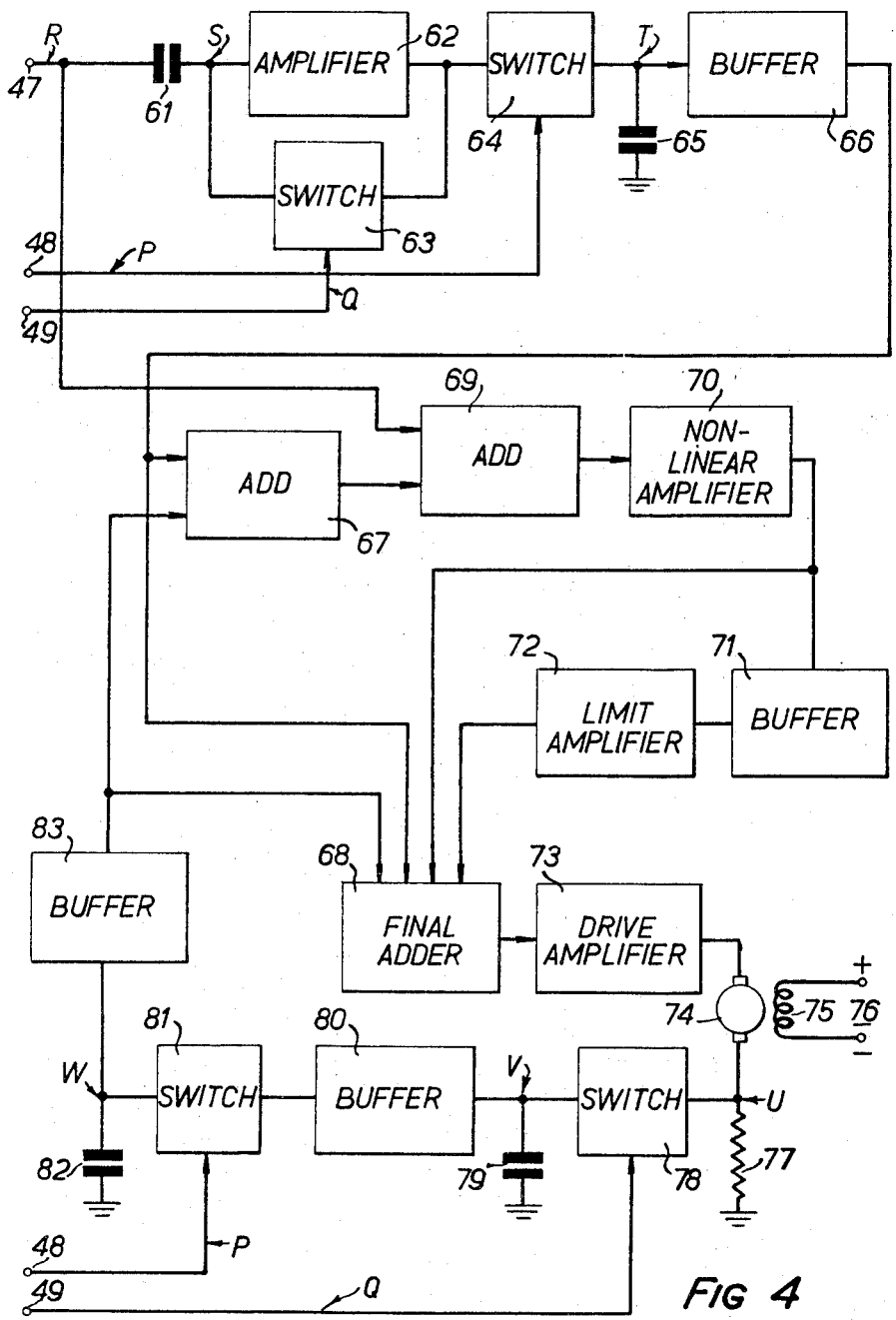
Figure 5:
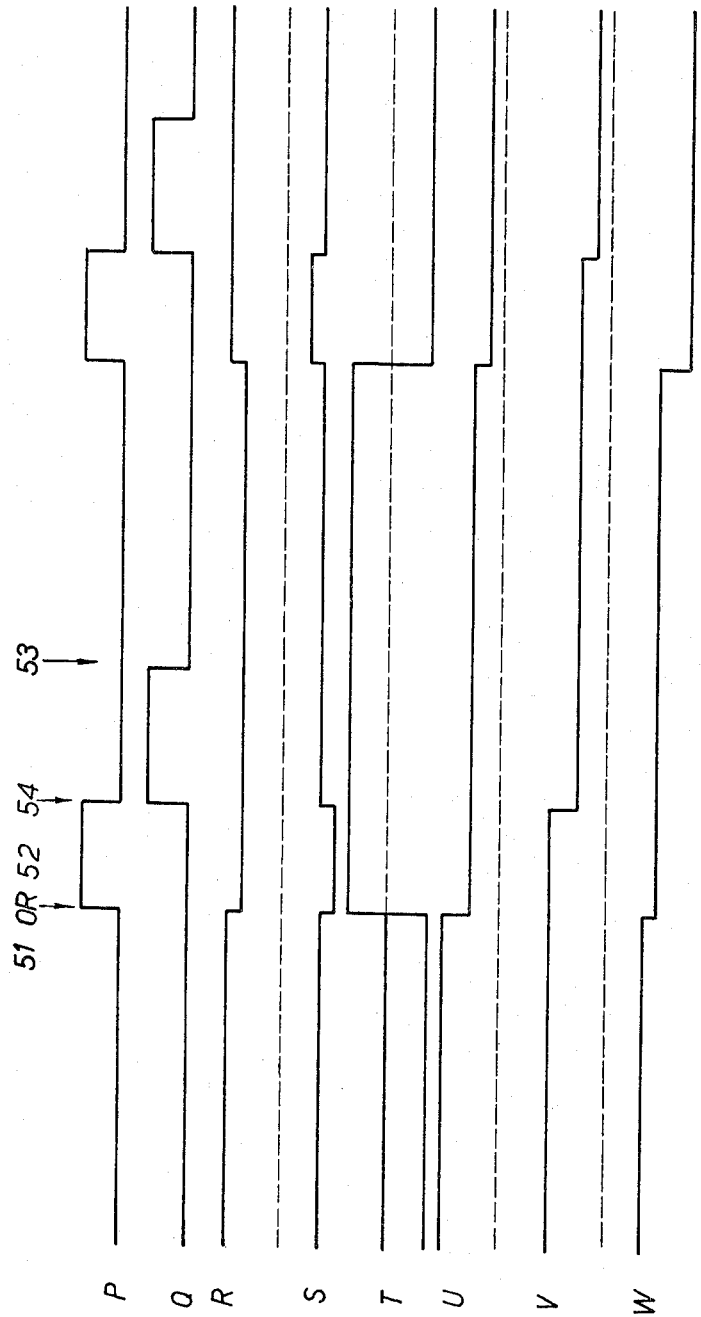

FIGURE 3 includes two series of waveform diagrams illustrating the operation of the apparatus described in relation to FIGURE 2;

FIGURE 4 is a block schematic diagram of the remainder of the embodiment of the invention of which part is described in relation to FIGURE 2; and FIGURE 5 is a series of waveform diagrams illustrating the operation of parts of the circuit arrangement described in relation to FIGURE 4.

Figure 1:
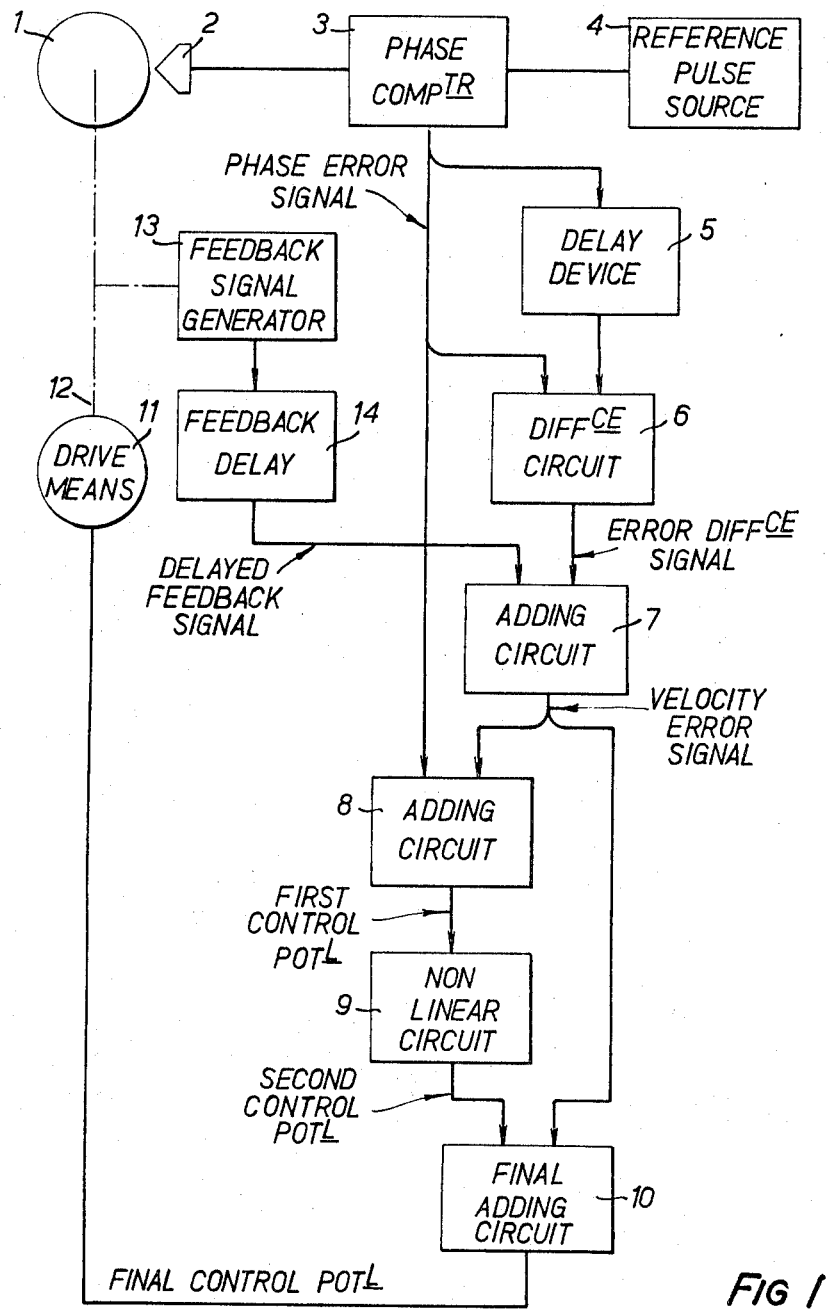
FIGURE 1 is a block diagram of the basic means according to the invention for controlling the movement of a member with respect to a train of reference impulses.

In the apparatus shown in FIGURE 1 is a member 1 of which the movement is to be controlled with respect to a train of reference impulses is provided with elements (not shown) which cooperate with a transducer device 2 to yield a train of impulses which, when the member is moving in a desired manner have the same frequency and phase as a train of reference impulses. The member 1 may be a non-magnetic disc provided with magnetic elements cooperating with a magnetic transducer head, or it may be a perforated disc cooperating with a light source and photo-sensitive device, or some other known combination of elements may be used, as convenient. The number of elements is chosen such that the pulse train produced has the required repetition rate and their angular position is selected to yield the required phasing. The impulses produced by transducer 2 are applied to a phase comparator 3 in which they cooperate with a train of reference impulses derived from a conventional source 4. Comparator 3 is arranged to yield an output signal of which the magnitude represents the difference in the timing of pulses in the two impulse trains applied to the comparator, while the polarity represents the direction of this difference. This signal will for convenience be referred to as the phase error signal.

The phase error signal thus developed in comparator 3 is applied to a delay device 5 in which the signal is preserved until the error signal resulting from the next subsequent measurement is available. The delayed signal thus obtained and the undelayed signal are applied to a difference circuit 6 in which they are compared to develop an error difference signal representing in magnitude the amount and in polarity the sense of any difference in amplitude between the two signals.

The error difference signal developed by difference circuit 6 is applied to a first adding circuit 7 in which it is combined with a delayed feedback signal, the derivation of which is discussed later, to develop a velocity error signal proportional to the sum of one-half the error difference signal added to the delayed feedback signal.

The velocity error signal developed in adding circuit 7 is applied to a second adding circuit 8 in which it is combined with the phase error signal to develop a first control potential proportional to one-half the velocity error signal added to the phase error signal. This first control potential is then applied to a non-linear circuit 9 which has a transfer characteristic such that its response to signals of either polarity is linear within a predetermined range of magnitude and for signals exceeding this range has an incremental gain which continuously diminishes as the magnitude of the signal increases. The output from non-linear circuit 9 forms a second control potential, which is applied together with the velocity error signal to a final adding circuit 10 which yields a final control potential proportional to the sum of the second control potential, and the velocity error signal.

This final control potential is applied to a drive means 11 to produce on member 1 by way of force transmission means represented by chain-line 12 a force proportional in amount to its magnitude and of direction corresponding to its polarity. In many applications it will be convenient for drive means 11 to be constituted by a direct-current commutator motor with constant field excitation.

It is necessary, in order to carry out the invention, to develop a feedback signal proportional in amount to the force exerted upon the controlled member and representing by its polarity the direction of that force. For this purpose a device 13 responsive to the force in transmission means 12 is employed.

Various conventional means, such as piezo-electric transducers and load cells may be used for this purpose. When the controlled member is driven by a direct-current motor with constant field excitation the armature current is proportional to the torque and hence to the force exerted on the member. It is therefore a simple matter to derive a voltage proportional to the armature current and to employ this as the feedback signal. The feedback signal derived from device 13 is delayed until the next measurement period by a suitable delay device 14, the nature of which will be discussed later, and is then applied as the delayed feedback signal to adding circuit 7.

FIGURE 2 is a block schematic diagram of circuit arrangements suitable for carrying out the functions of elements 2, 3, 5 and 6 of FIGURE 1.

A transducer 21 develops signals representative of the movement of the controlled member. The nature of this transducer may vary according to the specific application of the invention, many different devices capable of performing the required function are known to those skilled in the art. Specifically, however, a photocell cooperating with a shutter and light source in known manner may be used, though this has disadvantageous features which may be avoided if there is employed as the transducer a magnetic transducer head co-operating with appropriately spaced magnetic elements carried upon the controlled member. The signals which are derived from transducer 21, whatever its nature, are applied to an amplifier 22 which may be of any suitable known type adapted to match the transducer output characteristics and yielding an amplified signal. The amplified signal from amplifier 22 is in the present embodiment applied to a trigger circuit 23, conveniently a trigger of the Schmitt type, which responds to the initial rise in the signal from the magnetic transducer head by assuming a triggered condition from which it is returned to yield the controlling edge of its output signal at the rapid passage through zero of the signal from the transducer consequent upon the passage of the co-operating magnetic element past the transducer gap. This arrangement prevents any variation in the characteristics of transducer and amplifier from affecting the timing of the controlling edge in the trigger circuit output signal. The signal thus modified is applied to control transitions of a bi-sable circuit 24 from a first to a second stable condition. This bi-stable circuit is of a known kind which may be caused to change from each of its stable conditions to the other only by the application of an appropriate signal to the proper input terminal.

Reference impulses, which in the present application are television field synchronising pulses, are received at an input terminal 25 and applied thence to a synchronising signal clipper circuit 26 in which those portions of the pulses lying below a predetermined amplitude are clipped off in order to reduce the risk of spurious response. The clipped signals are applied to a monostable multivibrator circuit 27 which provides an output signal in which the effective edges are delayed by 0.7 ms. for reasons which do not concern the present invention.

The delayed reference pulses are applied to one input of a second bi-stable circuit 28, identical in action with bi-stable circuit 24, to cause it to pass from a first to a second stable condition. When in their second stable conditions, bi-stable circuits 24, 28 provide to an AND circuit 29 signals which cause this circuit to yield an effective output signal, which is applied by way of an OR gate 30 to the second input of each of bi-stable circuits 24, 28 to return these circuits to their first stable conditions.

The effect of this portion of the circuit of FIGURE 2 will now be further discussed with reference to waveforms A–F of FIGURE 3, in which the left-hand columns of waveforms relate to a condition of operation in which the impulse from transducer 21 arrive before those from the reference source, while the right-hand column relates to the reverse condition.

Waveform 3A represents the output signal from trigger circuit 23, in which the trailing edge 51 carries the phase information. Waveform 3B represents the television synchronising signal received at terminal 25, yielding at the output of multivibrator 27 a pulse represented by waveform 3C, in which the timing information is again contained in the trailing edge 52. When, as illustrated by the left-hand waveforms, pulse A leads pulse C, then bi-stage circuit 24 will yield the output signal shown in waveform 3D, commencing when pulse A commences and terminating after an interval derived as will be described. Under the same conditions, bi-stable circuit 28 yields an output signal, represented by waveform 3E, which commences with the trailing edge of pulse C and terminates coincidently with pulse D as will be described.

Since the output from AND gate 29 acquires the more negative of its two values only when both bi-stable circuits 24, 28, are yielding output signals, the output from this gate is, as shown by waveform 3F, a negative-going pulse commencing when the second of the bi-stable circuits to be actuated yields an output and terminating when the bi-stable circuits are restored to their initial condition.

The output pulse F from AND gate 29 is fed by way of OR gate 30 to the second input of bi-stable circuits 24, 28 as already mentioned. This pulse F is also applied to two AND gates 31, 32 and to two monostable multivibrators 33, 34. Multivibrator 34 yields an output pulse, illustrated by waveform 3G, which has a duration $t$ of 9 ms. This pulse is fed back to OR gate 30, which yields a negative-going output when either of its two input signals is positive. Gate 30 thus yields a positive-going output only at the end of the 9 ms. delay period of multivibrator 34, when both signals F and G have their more negative values. The output from OR gate 30 is applied to the second input terminals of both of bi-stable circuits 24 and 28, which are thus returned to their initial conditions. It is necessary for this pulse to persist for a time sufficient for both bi-stable circuits to be returned to the initial condition. Since pulse F from AND gate 29, and thus pulse H from gate 30, ends when either of the input signals to gate 29 ceases, it is desirable to ensure that there is sufficient delay in the restoration circuit to allow both bi-stable circuits to restore before pulse H ceases. Additional delay may, if necessary, be added in the lead from gate 29 to gate 30.

The gating arrangement described above ensures that the apparatus cannot perform a new measurement of the phase error until rather less than one-half the inter-pulse period of 20 ms. has elapsed, so that certain forms of incorrect operation are prevented.

The output signals D, E, of bi-stable circuits 24, 28 are applied to respective AND gates 31, 32, to which the output F from AND gate 29 is also applied. One or other of gates 31, 32 will yield an output during the period between the earlier and the later significant edges 51, 52 in signals A and C respectively. When the timing edge of pulse A leads that of pulse C, then gate 31 will yield an output commencing at the timing edge of pulse A and persisting until that of pulse C arrives, as illustrated by waveform 3I, while gate 32 will not yield any output, as shown by waveform 3J. When pulse C leads pulse A, on the other hand, then gate 32 will yield an output as shown by waveforms 3J′, while gate 31 will not yield any output, as shown by waveform 3I′.

The outputs from gates 31, 32, are applied to respective switch circuits 35, 36. When switch 35 is operated by an applied pulse it connects the unearthed terminal of a capacitor 37 by way of a resistor 38 to a source of direct potential positive with respect to earth, represented by terminal "+." When switch 36 is operated it connects capacitor 37 by way of a resistor 39 to a negative potential source represented by terminal "—." Thus when pulse A leads pulse C a positive increment of charge will be added to capacitor 37, as illustrated by waveform 3K, while if pulse C leads pulse A a negative increment of charge will be added, as shown by waveform 3K'.

It has already been stated that the pulse from AND gate 29 is applied to multivibrators 33, 34, and one function of the 9 ms. pulse from multivibrator 34 has already been discussed. This pulse is also applied to two further AND gates 40 and 41, to which also are applied respectively outputs of opposite polarity from multivibrator 33, which generates a pulse of 4 ms. duration. AND gate 40 thus yields an output pulse of 4 ms. duration, illustrated by waveform 3L. This pulse is applied to actuate a switch 42 which, when thus closed, connects the potential appearing on capacitor 37 by way of a buffer amplifier 43 to the unearthed terminal of a further capacitor 44, the potential on which therefore assumes the same value as that on capacitor 37, as illustrated by waveforms 3M, 3M'.

AND gate 41, on the other hand, yields a pulse delayed by 4 ms. and of 5 ms. duration, as illustrated by waveforms 3N, 3N'. This pulse is applied to close a switch 45 which then earths the normally unearthed terminal of capacitor 37, which is thus discharged ready to perform a new measurement.

The potential appearing on capacitor 44 thus changes stepwise from one pulse period to another. This potential forms the phase error signal and is fed out for use as required by way of a buffer amplifier 46 and an output terminal 47.

It should be noted in FIGURE 3 that lines 51, 52, 53, 54 in the two columns represent equivalent instants in an operating cycle.

The 4 ms. and 5 ms. pulses produced by AND gate 41 and by AND gate 40 respectively are fed out by way of terminals 48, 49 respectively for use in controlling other circuit operations described in connexion with FIGURE 4.

Since the output from AND gate 41 is identical with that from multivibrator 33, the gate could possibly be dispensed with, but it serves to ensure that no spurious signal can be applied to switch 45 when the 9 ms. pulse from multivibrator 34 is not present.

In FIGURE 4, phase error signals received at terminal 47 from the correspondingly numbered terminal of the circuit described in relation to FIGURE 2 are applied by way of a capacitor 61 to an amplifier 62. A negative feedback path is periodically established from the output to the input of amplifier 62 by way of a switch 63 operated by the 5 ms. gating pulses received at terminal 49 from the correspondingly numbered terminal of FIGURE 2. This ensures that the input terminal of amplifier 62 is brought to the same potential as the output terminal, that is substantially to earth potential. Switch 63 then opens again to remove the feedback. The potential thus appearing across capacitor 61 for the remainder of the 20 ms. inter-pulse period represents the value of the phase error already measured. When the next phase-error measurement is made a new value of error potential will be applied to terminal 47, but the potential across capacitor 61 does not change at this time. The potential now applied to the input of amplifier 62 will therefore represent the difference between the preceding and present error potentials.

A further switch 64 is closed by the 4 ms. pulse received at terminal 48 from the correspondingly numbered terminal of FIGURE 2 and commencing at the beginning of another measurement, i.e. at time 51 or 52, whichever occurs first. There is then developed across capacitor 65 a potential corresponding to that at the output of the amplifier 62, and therefore proportional to the error difference. The potential appearing across capacitor 65 is fed out by way of a buffer amplifier 66 to form the error difference signal.

In adder stage 67 the error difference signal from buffer amplifier 66 is combined with a delayed feedback signal which is derived in a manner described later and which has a polarity and magnitude representing the direction and amount of the force applied to the controlled member during the preceding inter-pulse period. The arrangement of adding stage 67 is such that its output signal, the polarity of which is inverted with respect to the input, forms a velocity error signal proportional to one-half the delayed feedback signal added to the error difference signal.

The velocity error signal thus formed in added stage 67 is applied to a second adder stage 69 in which it is combined with the phase error signal received at terminal 47 to form a first control potential proportional to one-half the velocity error signal added to the phase error signal. The first control potential thus developed is applied to a non-linear amplifier 70, of which the differential gain decreases as the amplitude of the applied signal increases in either polarity. The output from non-linear amplifier 70 is applied firstly to final adding stage 68 and secondly by way of a buffer amplifier 71 and thence to a limiting amplifier 72 which has a linear response to applied signals of either polarity within a predetermined range of amplitudes only. The output of amplifier 72 is also fed to final adder state 68. The combination of signal from non-linear amplifier 70 and from limiting amplifier 72 provides to final adder 68 a signal which is non-linearly related to the first control potential, for the combination provides a transfer characteristic in which the differential gain decreases with signal amplitude at first gradually and then, as limiter 72 comes into effect, suffers a sudden diminution, after which the gradual decrease continues.

To final adder 68 there are also applied a signal representing the difference between successive values of the phase error signal and the delayed feedback signal previously mentioned. The proportions in which these two signals are combined are such that their combined effect is that of a signal proportional to the velocity error signal.

The output from final adder 68 is applied to a drive amplifier 73, which is arranged to deliver to the armature 74 of a motor driving the controlled member a current proportional to the applied final control voltage. Motor 74 is a direct current commutator motor of which the field winding 75 is fed with a constant current from a source represented by terminals 76. The torque exerted by motor 74, 75 is proportional to the current in its armature, so that the voltage appearing across a resistor 77 in series with the armature provides a signal proportional to the force exerted on the controlled member. This signal is applied by way of a switch 78 to a capacitor 79, across which there thus appears a signal proportional to the force exerted on the controlled member.

Switch 78 is closed by the 5 ms. gate pulse received at terminal 49 so that after each measurement has been completed the present value of the potential across resistor 77 is fed into capacitor 79. At the commencement of the next measurement switch 81 closes under the control of the 4 ms. pulse received at terminal 48 and transfers the potential on capacitor 79 to capacitor 82, whence it is fed by way of buffer amplifier 83 to adding circuit 67 and to final adder 68 to form the delayed feedback potential already referred to.

The invention is best carried out by the apparatus described above when the gains of the various circuit elements are so adjusted that for small values of error the force applied by motors 74, 75 to the controlled member is that defined by the equation:

$$A = -\tfrac{3}{2}V - E$$

where A is the force applied to the controlled member during a given period, V is the value of the velocity error measured at the commencement of the period and E is the value of the phase error measured at the same time.

While particular embodiments of the invention have been shown and described, it is apparent that changes and modifications may be made without departing from the invention in its broader aspects. The aim of the appended claims, therefore, is to cover all such changes and modifications as fall within the true spirit and scope of the invention.

We claim:

1. A movement control servomechanism comprising in combination: a movable member; electrically controllable drive means; means connecting said drive means to exert a force on said member to produce movement thereof; a source of reference impulses of predetermined periodicity; a source of control impulses of periodicity related to the movement of said member; phase error means deriving a signal representing a phase difference between applied signals; circuit means applying said reference impulses and said control impulses to said phase error means to develop a phase error signal; signal delay means operable to delay applied signals by one period of said reference impulses; circuit means applying said phase error signal to said signal delay means; difference means yielding output signals representing differences between applied signals; circuit means applying said phase error signals and said delayed phase error signals to said difference means to develop a phase error difference signal; first adding means developing a velocity error signal proportional to the sum of one applied signal and of one-half a second applied signal; circuit means connecting said phase error difference signal to said first adding means as said one signal; second adding means developing a first control potential proportional to the sum of one-half a first applied signal and of a second signal; circuit means applying said velocity error signal to said second adding means as said first signal; circuit means applying said phase error signal to said second adding means as said second signal; nonlinear means yielding in response to an applied potential a second control potential linearly related to said applied potential within a predetermined amplitude range and related less than linearly to applied potentials exceeding said range; circuit means applying said first control potential to said nonlinear means; final adding means yielding a final control potential proportional to the sum of two applied signals; circuit means applying said second control potential and said velocity error signal to said final adding means; circuit means applying said final control potential to control said drive means; feedback means generating a signal proportional to said force exerted by said drive means; feedback delay means operating to delay an applied signal by one period of said reference impulses; circuit means applying said feedback signal to said feedback delay means and circuit means applying said delayed feedback signal to said first adding means as said other signal.

2. Apparatus as defined in claim 1 in which said phase error means comprises the combination of: first and second bistable means each operable to first and to second stable conditions by signals applied to respective first and second inputs thereof; each said bistable means yielding an output signal only when in said second stable condition; means applying said reference impulses to said second input of said first bistable means; means applying said control impulses to said second input of said second bistable means; first AND gate means having two inputs and one output; circuit means applying output signals from said first and from said second bistable means to respective inputs of said AND gate; circuit means connecting said output of said first AND gate to said first inputs of said first and of said second bistable means; second and third AND gate means each having two inputs and a single output; first and second voltage controlled switch means; a source of direct potential positive with respect to earth; a like source of direct potential negative with respect to earth; a capacitor having two terminals; an earth connexion to one said capacitor terminal; circuit means including said first switch means connecting said source of positive potential to said other capacitor terminal; circuit means including said second switch means connecting said source of negative potential to said other terminal of said capacitor; circuit means applying said output signals from said second AND gate to control said first switch means; circuit means applying said output signals from said third AND gate to control said second switch means; circuit means applying output signals from each of said bistable means to an input of an individual one of said second and third AND gates respectively and circuit means connecting signals from said first AND gate alike to the remaining inputs of said second and third AND gates.

3. Apparatus as defined in claim 1 in which said means delaying said phase error signal comprises in combination a capacitor having an earthed terminal and another terminal; means operable to apply said phase error signal from said phase error means to said other terminal of said capacitor; a second capacitor having one earthed terminal and having another terminal; fourth voltage operated switch means connecting said other terminal of said capacitor to said other terminal of said second capacitor; means developing first and second switch operating pulses occurring in the order stated in distinct intervals of time between successive ones of said periods; circuit means applying said first switch operating pulses to close said third switch; circuit means applying said second switch operating pulses to close said fourth switch; an output signal and means connecting said second capacitor to said output terminal.

4. Apparatus as defined in claim 1 in which said means delaying said phase error signal comprises in combination a capacitor having an earthed terminal and another terminal; means operable to apply said phase error signal from said phase error means to said other terminal of said capacitor; a second capacitor having one earthed terminal and having another terminal; fourth voltage operated switch means connecting said other terminal of said capacitor to said other terminal of said second capacitor; means developing an actuating pulse including a control transient with the commencement of the later of said reference and control impulses; first and second pulse generator means actuated by an applied transient to generate first and second successive pulses of predetermined durations; circuit means applying said control transient to actuate said pulse generator means; circuit means applying said first and second pulses respectively to close said third and fourth switches; circuit means applying said second switch operating pulses to close said fourth switch; an output signal and means connecting said second capacitor to said output terminal.

5. Apparatus as defined in claim 1 in which said means for developing said phase error difference signal comprises, in combination: a source of signals representing said phase error during successive ones of said periods; an amplifier having an input and an output; first capacitor means connecting said source to said amplifier input; fifth voltage operated switch means operable to connect said amplifier output to said amplifier input; a point at constant potential; an output terminal; second capacitor means connecting said output terminal to said point; sixth voltage operated switch means operable to connect said amplifier output to said output terminal; a source of successive first and second voltage pulses and circuit means applying said first and second voltage pulses from said source to said fifth and sixth switches respectively.

6. Apparatus as defined in claim 1 in which said drive means is constituted by a direct current electric motor having an armature and having constant field excitation, together with voltage controlled direct current supply means; circuit means applying said final control potential to control said current supply means and circuit means applying said current from said supply means to said motor armature.

7. Apparatus as defined in claim 1 in which said drive means includes a direct-current electric motor having an armature fed with a current controlled by said final control potential and in which said means for developing said feedback signal comprises a resistor connected in series with said armature.

8. Apparatus as defined in claim 1 in which said feedback signal is developed across a resistor connected in series with a direct-current motor constituting said drive means and in which said feedback signal delay means comprises the combination of: first and second capacitor means; each said capacitor means having an earthed and an unearthed terminal; first and second voltage operated switch means; means including said first switch connecting said feedback voltage to said unearthed terminal of said first capacitor; means including said second switch connecting said unearthed terminal of said first capacitor to said unearthed terminal of said second capacitor; sources of consecutive first and second voltage pulses and circuit means applying said first and second pulses to control said second and said first switch means respectively.

9. Apparatus as defined in claim 1 in which said source of control impulses comprises a magnetic transducer head; and magnetic pattern means coupled for movement with said member, said transducer head being disposed for cooperation with said pattern means to develop said control impulses.

10. A movement control servomechanism comprising in combination: a movable member; electrically controllable drive means; means connecting said drive means to exert a force on said member to produce movement thereof; a source of reference impulses of predetermined periodicity; a source of control impulses of periodicity related to the movement of said member; phase error means deriving a signal representing a phase difference between applied signals; circuit means applying said reference impulses and said control impulses to said phase error means to develop a phase error signal; signal delay means operable to delay applied signals by one period of said reference impulses; circuit means applying said phase error signal to said signal delay means; difference means yielding output signals representing differences between applied signals; circuit means applying said phase error signals and said delayed phase error signals to said difference means to develop a phase error difference signal; first adding means developing a velocity error signal proportional by a first factor of proportionality to the sum of one applied signal and of one-half a second applied signal; circuit means connecting said phase error difference signal to said first adding means as said one signal; second adding means developing a first control potential proportional by a second factor of proportionality to the sum of one-half a first applied signal and of a second signal; circuit means applying said velocity error signal to said second adding means as said first signal; circuit means applying said phase error signal to said second adding means as said second signal; nonlinear means yielding in response to an applied potential a second control potential linearly related to said applied potential within a predetermined amplitude range and related less than linearly to applied potentials exceeding said range; circuit means applying said first control potential to said nonlinear means; final adding means yielding a final control potential proportional by a third factor of proportionality to the sum of two applied signals; circuit means applying said second control potential and said velocity error signal to said final adding means; circuit means applying said final control potential to control said drive means; feedback means generating a signal proportional to said force exerted by said drive means; feedback delay means operating to delay an applied signal by one period of said reference impulses; circuit means applying said feedback signal to said feedback delay means and circuit means applying said delayed feedback signal to said first adding means as said other signal, said factors of proportionality being such that said force exerted on said member is defined by the equation $$A = -\tfrac{3}{2}V - E$$

where A is for force applied to said controlled member during the period between successive measurements, V is the value of the velocity error measured at the commencement of said period and E is the value of the phase error measured at the commencement of said period.

References Cited

UNITED STATES PATENTS

| 3,011,110 | 11/1961 | Yu-Chi Ho et al. | 318—162 XR |
| 3,122,686 | 2/1964 | Davies et al. | 318—18 |
| 3,160,803 | 12/1964 | White | 318—28 |

BENJAMIN DOBECK, *Primary Examiner.*